R. D. PIKE ET AL

PROCESS FOR MANUFACTURE OF CHLORIDE OF POTASSIUM AND CARBONATES OF SODIUM AND POTASSIUM

March 22, 1932.

Re. 18,393

Original Filed June 6, 1928 2 Sheets-Sheet 1

INVENTOR.
Robert D. Pike
Ross Cummings
Leo V. Steck

BY Townsend, Lefler & Abbett
ATTORNEYS.

R. D. PIKE ET AL
PROCESS FOR MANUFACTURE OF CHLORIDE OF POTASSIUM
AND CARBONATES OF SODIUM AND POTASSIUM

March 22, 1932. Re. 18,393

Original Filed June 6, 1928 2 Sheets-Sheet 2

INVENTORS.
Robert D. Pike,
Ross Cummings,
Leo V. Steck.
BY Lounsbury, Loftus & Abbott
ATTORNEYS.

Reissued Mar. 22, 1932

Re. 18,393

UNITED STATES PATENT OFFICE

ROBERT D. PIKE, OF DIABLO, ROSS CUMMINGS, OF BERKELEY, AND LEO V. STECK, OF OAKLAND, CALIFORNIA; SAID CUMMINGS AND SAID STECK ASSIGNORS TO SAID PIKE

PROCESS FOR MANUFACTURE OF CHLORIDE OF POTASSIUM AND CARBONATES OF SODIUM AND POTASSIUM

Original No. 1,770,995, dated July 22, 1930, Serial No. 283,405, filed June 6, 1928. Application for reissue filed January 11, 1932. Serial No. 585,980.

Our present invention relates to a process for the manufacture of carbonates of sodium and potassium and chloride of potassium, and more particularly to a process for the manufacture of the above from the natural resources located in and near Green River, Wyoming.

This application is a continuation in part of a former application filed by us on March 6, 1928, and designated as Serial Number 259,422.

Near Green River, Wyoming, there is a large deposit of potassium silicate rock known as wyomingite, of which leucite is the principal potash bearing constituent and at Green River there is available by pumping from shallow wells, a brine composed principally of sodium carbonate with a lesser content of sodium chloride.

It is an object of our present invention to manufacture from these two important raw materials, or from like or analogous materials occurring elsewhere, commercially pure chloride of potassium, commercially pure sodium carbonate, and a brine carrying principally potassium carbonate in solution.

Figure 1:
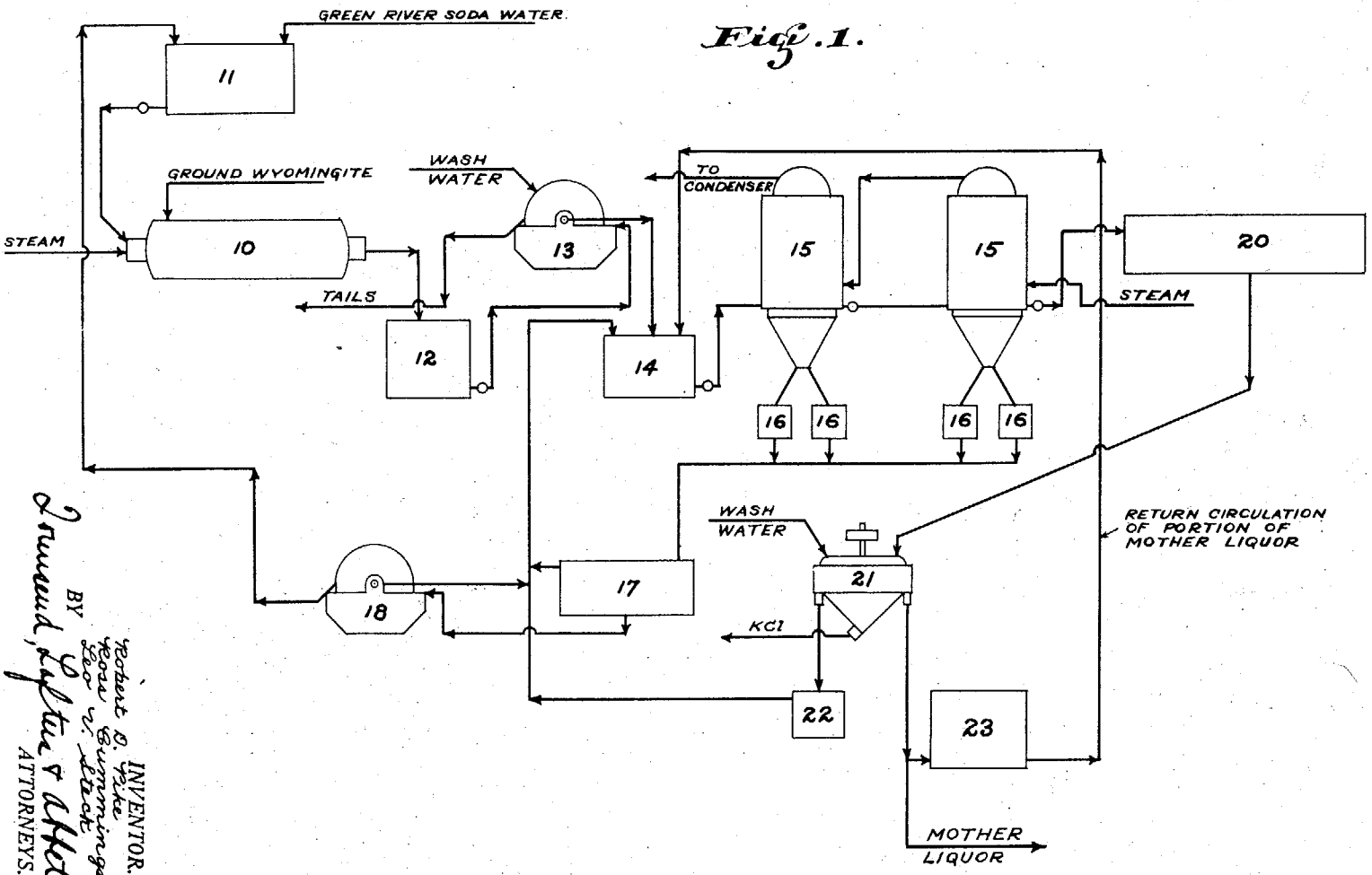

A method for carrying out our invention, in which the sodium carbonate is not produced as such but is circulated in the process, is illustrated in Figure 1 of the accompanying flow sheets, in which 10 designates an autoclave or other suitable type of pressure vessel illustrated as a tumbling autoclave adapted to treat ground wyomingite under agitation and at substantially 200 pounds steam pressure with a mixed solution of sodium carbonate and Green River soda brine which is prepared in a dissolving tank 11, as will hereinafter appear. After treatment in this autoclave for a suitable length of time to extract from the wyomingite substantially all of the potassium which is subject to base exchange with sodium under the conditions obtaining, the pulp is removed to a storage tank 12 and is thence pumped to a continuous filter 13 where the potash bearing solution is removed from the solids and the latter washer. The washed solids are the tails and are rejected. The solution and wash water pass to a storage tank 14 whence they are pumped through a set of multiple effect evaporators 15 in countercurrent to the passage of the vapors therethrough. This method of operating evaporators in countercurrent is known as "backward feed." In the evaporating process sodium carbonate monohydrate is salted out and is removed as a pulp from salt boxes 16 of any suitable type and passes to a thickener 17 and thence to a suitable filter 18. The clear liquor from the filter 18 and the thickener 17 join and pass to the evaporator supply tank 14. The dewatered sodium carbonate mono hydrate is transported to the dissolving tank 11, previously referred to, where it is dissolved in the Green River soda brine. The solution thus formed, together with the ground wyomingite forms the feed to the autoclave 10. The strong solution from the last or high pressure effect of the evaporators 15 goes to the crystallizer 20, where it is cooled to 25° to 30° C. This cooling causes pure KCl to crystallize, the chlorine associated therewith corresponding to the major part of the chlorine which is introduced into the system as sodium chloride in the Green River soda brine.

The pulp from the crystallizer 20 then goes to a centrifugal separator 21, where KCl crystals are separated out and washed. The wash water goes to a tank 22 whence it is pumped back to the evaporator supply tank 14. The mother liquor from the centrifuge 21 next goes to the tank 23. It is desirable to have the chloride content of this mother liquor as low as possible, and to have the ratio $K_2O/Na_2O$ as high as possible.

In the two quantitative examples of the carrying out of the method given below, it is shown, as we have discovered, that this end is served by returning in circulation to the evaporator supply tank 14 a portion, preferably one-half, of the solution from tank 23.

The net advance of solution passing forward from the tank 23 contains all of the potash which was removed from the wyomingite in the autoclave 10, except that removed as chloride of potassium (KCl) in 21, almost entirely in the form of potassium carbonate. This finished potash brine can be employed for the manufacture of commercially pure potassium carbonate as disclosed in our copending application filed March 6, 1928, Serial No. 259,423, or for the manufacture of crude mono potassium phosphate as disclosed in a copending application filed by Robert D. Pike, March 6, 1928, Serial Number 259,421.

In both examples of carrying out our process described below, the following are the analyses of the Green River soda brine and wyomingite respectively:

*Green River soda brine*

| | Per cent |
|---|---|
| Spec. gr. | 1.100 |
| $K_2O$ | .075 |
| $Na_2O$ | 6.74 |
| NaCl | 2.32 |
| $Na_2CO_3$ | 8.30 |
| $NaHCO_3$ | 0.71 |
| $Na_2S$ | 0.18 |
| $Na_2SO_4$ | .04 |
| Total solids | 11.05 |

*Wyomingite*

| | |
|---|---|
| $K_2O$ | 11.48 |
| $Na_2O$ | 1.32 |
| $SiO_2$ | 51.70 |
| $Al_2O_3$ | 13.05 |
| $Fe_2O_3$ | 4.20 |
| FeO | 1.28 |
| CaO | 6.80 |
| MgO | 7.60 |
| $P_2O_5$ | 2.75 |

The wyomingite is ground dry to have the following screen analysis:

| | Per cent |
|---|---|
| −10+ 14 | 0.3 |
| −14+ 20 | 4.0 |
| −20+ 28 | 10.4 |
| −28+ 35 | 10.9 |
| −35+ 48 | 12.2 |
| −48+ 65 | 7.0 |
| −65+100 | 7.8 |
| −100+160 | 5.4 |
| −150+200 | 6.5 |
| −200 | 35.5 |

*Example No. 1*

One quarter of solution from tank 23 is returned in circulation to tank 4. The feed to the autoclave 10 is in batches which per 100 pounds wyomingite follow:

| | Pounds |
|---|---|
| Wyomingite | 100 |
| Return sodium carbonate mono hydrate | 21.8 |
| Green River soda brine | 100.8 |

After the treatment in the autoclave 10, the removal and washing of the tails and the addition of the return solution from tank 23 and the washwaters, the composition of the evaporator feed per ton (2000 pounds) of $K_2O$, produced as KCl crystals and as $K_2CO_3$ in the finished brine, is as follows:

| | Pounds |
|---|---|
| KCl | 777 |
| $K_2CO_3$ | 2988 |
| $Na_2CO_3$ | 5514 |
| $H_2O$ | 30500 |

A method for producing from such a solution pure crystals of KCl and $Na_2CO_3H_2O$ on the one hand and a substantially pure brine of $K_2CO_3$ on the other, has not hitherto been known and discovery of such a method constitutes one of the principal features of our invention. We have discovered that if this brine be evaporated preferably at, or nearly at, atmospheric boiling temperatures, until the liquor becomes saturated with reference to both KCl and $Na_2CO_3$, there will crystallize out during this process of concentration 5440 pounds of pure $Na_2CO_3H_2O$ per ton of $K_2O$ as above defined, and that the water evaporated will amount to 25,331 pounds. Furthermore no crystallization of the $Na_2CO_3H_2O$ occurs until there have been evaporated 13,255 pounds of water. In carrying out the process in multiple effect evaporators, backward feed is employed so that the crystals of $Na_2CO_3H_2O$ will form in the effects boiling at the higher temperatures. This procedure insures the production of a quick settling and free filtering crystal.

The strong solution from the evaporator contains the following per ton of $K_2O$ as above defined.

| | Pounds |
|---|---|
| KCl | 777 |
| $K_2CO_3$ | 2988 |
| $Na_2CO_3$ | 875 |
| $H_2O$ | 4379 |

This solution has a specific gravity hot of 1.527 and boils at atmospheric pressure at 120° C. We have discovered that if this solution is cooled in mechanical crystallizers to 25° C. fairly rapidly, pure KCl crystallizes, in spite of the fact that the stable solid phase, which should be in equilibrium with the resulting solution according to Blasdale, Jour. Am. Chem. Soc. 45, 2935 (1923) is $KNaCO_36H_2O$. The mother liquor remains supersaturated with respect to this latter salt and pure KCl crystals are recovered by centrifuging.

The solution from the crystallizer 20 contains the following per ton of $K_2O$ as above defined:

| | Pounds |
|---|---|
| KCl | 123 |
| $K_2CO_3$ | 2988 |
| $Na_2CO_3$ | 875 |
| $H_2O$ | 4379 |

One-quarter of this solution is returned in circulation to the evaporator feed and the balance is the net brine produced by the process.

*Example No. 2*

One-half of the solution from tank 23 is returned in circulation to tank 14.

The feed to the autoclave 10 per 100 pounds of wyomingite is as follows:

| | Pounds |
|---|---|
| Wyomingite | 100 |
| Return sodium carbonate mono hydrate | 22.2 |
| Green River soda brine | 97 |

After the treatment in the autoclave, the removal and washing of the tails and the addition of the return solution from tank 23 and the wash waters, the composition of the evaporator feed per ton (2000 pounds) of $K_2O$ produced as KCl crystals and as $K_2CO_3$ in the finished brine, is as follows:

| | Pounds |
|---|---|
| KCl | 778 |
| $K_2CO_3$ | 4538 |
| $Na_2CO_3$ | 5840 |
| $H_2O$ | 31400 |

After evaporating in the same manner as described under Example 1, a strong solution is produced which contains per ton $K_2O$, as above defined, the following:

| | Pounds |
|---|---|
| KCl | 778 |
| $K_2CO_3$ | 4538 |
| $Na_2CO_3$ | 1090 |
| $H_2O$ | 5660 |

If this solution is cooled as above described to 25° C. it remains supersaturated to the stable solid phase, $KNaCO_3 6H_2O$, and pure KCl is crystallized. After this is removed by centrifuging, there remains in the mother liquor per ton of $K_2O$ as above defined, the following:

| | Pounds |
|---|---|
| KCl | 123 |
| $K_2CO_3$ | 4538 |
| $Na_2CO_3$ | 1090 |
| $H_2O$ | 5660 |

One-half of this solution is returned in circulation to the evaporator feed and the balance is the net brine produced by the process.

The effect of increasing the circulation of strong brine after crystallizing the KCl is illustrated in the following summary.

| | Return of ¼ of strong brine | Return of ½ of strong brine |
|---|---|---|
| Mol ratio $K_2O/Na_2O$ | 2.723 | 3.260 |
| Mol ratio $CO_3/Cl_2$ | 36.04 | 51.6 |

The improvement effected both in increasing the ratio $K_2O/Na_2O$ and $CO_3/Cl_2$ is marked, by increasing the circulation of the strong brine. The finished brine produced by circulating one-half the strong brine is pure enough to make crude mono potassium phosphate suitable for fertilizer use direct by neutralization with phosphoric acid as disclosed in the Pike case, previously referred to.

Our process is applicable to leaching with brines containing lesser or greater amounts of NaCl and greater or lesser amounts of $Na_2CO_3$ than the Green River soda water. As the content of NaCl decreases, the amount of liquor which it is necessary to circulate from tank 23 to tank 14, so as to produce a potassium carbonate brine of desired purity decreases until in the limiting case when the leach liquor is all sodium carbonate with no sodium chloride it is unnecessary to employ circulation in order to produce a brine in which the mol ratio $K_2O/Na_2O$ is greater than 3; and, in such limiting case, the crystallizer 20 would be eliminated and the strong liquor from the evaporator would be the finished carbonate brine. On the other hand, as the sodium chloride content in the leaching brine increases, a point is speedily reached where the flow sheet of Figure 1 is no longer adequate to produce a potassium carbonate brine of the desired purity, but the latter will contain undesirably large amounts of both sodium carbonate and potassium chloride.

If the sodium carbonate mono hydrate, instead of being returned in circulation in the process, is removed and washed free from mother liquor, it is a commercially pure salt which can be used as such, or easily converted to soda ash or caustic soda. To do this, therefore, constitutes a valuable variation of our process; but in so doing, the leaching brine becomes the Green River soda brine in which no sodium carbonate has been dissolved. In effect, therefore, the leaching brine which goes to the autoclave contains much more sodium chloride in relation to sodium carbonate than is the case in Figure 1, and the solution of this case, using the Green River soda brine, is virtually also the solution of the case involving the use of the flow sheet of Figure 1 with a brine containing a much larger amount of sodium chloride than the Green River brine.

Figure 2:
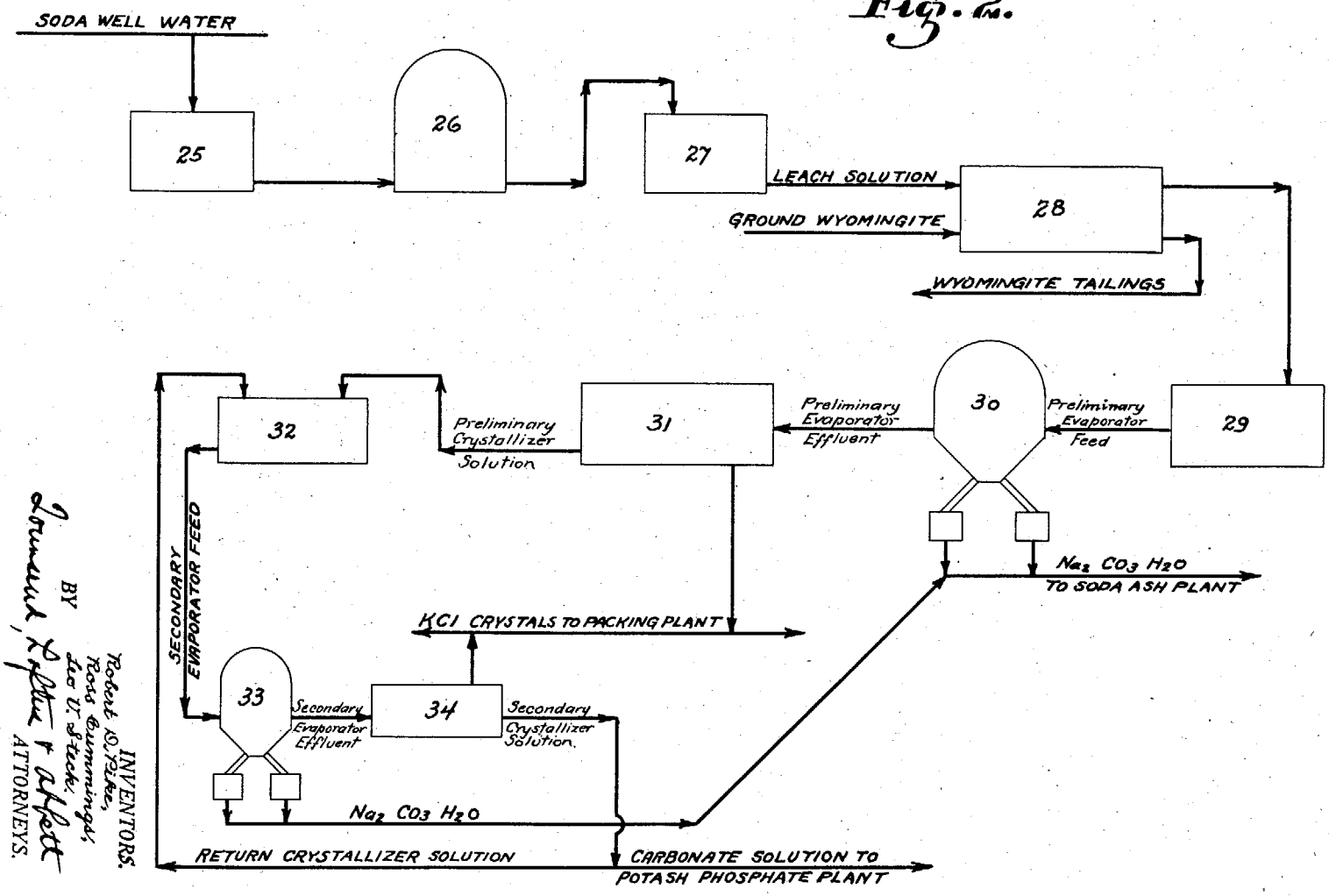

Figure 2 shows a flow sheet for use of the Green River soda brine for leaching wyomingite in which all of the sodium carbonate mono hydrate is removed. In Figure 2, 25 is a storage tank for the Green River soda brine, from whence it is fed through a preliminary evaporator 26, where 60% of its water is evaporated amounting to about 34,800 pounds per ton (2000 pounds) of total $K_2O$ which is eventually produced by the process as the chloride and the carbonate. The concentrated brine is the leach solution and is stored in a tank 27, and then goes to a leaching plant 28 whence it is introduced together with ground wyomingite into the autoclave, as previously described. The treatment in the leaching plant is the same as in flow sheet Figure 1 and after filtration and washing of the tails the combined filtrate and wash water goes to a primary evaporator storage 29.

For each ton of potash produced there are required about 25,000 pounds of wyomingite and 30,650 pounds concentrated brine containing:

| | Pounds |
|---|---|
| $Na_2O$ as NaCl | 804 |
| $Na_2O$ as $Na_2CO_3$ | 3608 |
| Water | 26238 |

Hereafter, all figures named will be per ton (2000 pounds) of total $K_2O$ produced.

The potash rich solution which goes to the primary evaporator storage 29 from the leaching plant contains:

| | Pounds |
|---|---|
| KCl | 1934 |
| $K^2CO_3$ | 1141 |
| $Na_2CO_3$ | 5297 |
| $H_2O$ after addition of wash | 34400 |

From tank 29 the liquor passes through primary salting out evaporators 30. These evaporators are operated on the counter current principle, and the sodium carbonate mono hydrate which is salted out is removed. The latter is treated by suitable standard apparatus, not illustrated, for separation from the mother liquor and drying. The primary evaporators produce about 4660 pounds $Na_2CO_3H_2O$ and evaporate about 25,000 pounds of water. The strong liquor from the primary evaporator 30 goes to a primary crystallizer 31 where it is cooled to from 25° to 30° C. producing about 1140 pounds KCl. The latter is removed and free from the mother liquor by suitable well known apparatus not illustrated and the mother liquor goes to a secondary evaporator storage 32.

From the secondary evaporator storage tank 32 the liquor goes to secondary evaporators 33 where about 1225 pounds of $Na_2CO_3H_2O$ is salted out and about 5000 pounds of water is evaporated. These secondary evaporators also work on the counter current principle. The strong liquor then goes to a secondary crystillizer 34 where it is cooled to a temperature of 25° to 30° C. and about 765 pounds of KCl is salted out. The latter is removed from the primary crystallizer and of the clear liquor 80% is returned in circulation to the storage tank 32, the remaining 20% constituting the net yield of potassium carbonate. By the above procedure we have found that the final carbonate brine is made to contain only a trace of KCl and to have a mol ratio of $K_2O/Na_2O$ of about 3.26/1.

The net brine is made up as follows:

| | Pounds |
|---|---|
| KCl | 29 |
| $K_2CO_3$ | 1141 |
| $Na_2CO_3$ | 265 |
| $H_2O$ | 1377 |

Of the total $K_2O$ produced, about 60% is as the chloride and 40% as the carbonate, and for each ton of $K_2O$ there are produced 5885 pounds $Na_2CO_3H_2O$.

It will be observed that the ratio $$KCl—K_2CO_3—Na_2CO_3$$

is substantially the same in the postassium carbonate brine produced by the flow sheet of Figure 2 as by that of Figure 1.

It will be understood that our process is applicable to any postassium silicate mineral whose potassium is amenable to base exchange with sodium, and to any leaching brine carrying principally the carbonates and chlorides of sodium, and whenever the terms "wyomingite" and "Green River soda brine" are employed in the appended claims, it will be understood that like or analogous materials are included.

Having thus described our invention, what we claim and desire to secure by Letters Patent is:

1. A process for producing a carbonate brine containing a predominating amount of potassium carbonate from wyomingite and a brine composed principally of a solution of sodium carbonate in water, which consists in grinding wyomingite and leaching under steam pressure with the said brine, removing the leach solution from the solids, evaporating so as to crystallize out sodium carbonate mono hydrate and removing crystals of the latter salt until the mol ratio $K_2O/Na_2O$ in the mother liquor is greater than 2.

2. A process for treating the system $Na_2K_2CO_3Cl_2H_2O$ for separation of $Na_2CO_3H_2O$, KCl and $K_2CO_3$ which consists in evaporating to salt out $Na_2CO_3H_2O$, cooling the mother liquor to salt out KCl crystals, evaporating the remaining mother liquor in a secondary evaporator to salt out additional $Na_2CO_3H_2O$, cooling the mother liquor to salt out additional KCl, and circulating a portion of the last named mother liquor back through the secondary evaporator, thus leaving a brine carrying principally $K_2CO_3$.

3. In a process for producing salts of potassium and sodium by leaching potassium of silicate base exchange minerals with a brine carrying principally the carbonate and chlorides of sodium, the steps of separating the sodium carbonate, potassium carbonate and potassium chloride respectively, which consist in evaporating the leach liquor so as crystallize out sodium carbonate monohydrate, and then cooling the mother liquor to crystallize out susbtantially pure potassium chloride, evaporating the remaining mother liquor in a secondary evaporator to salt out additional $Na_2CO_3H_2O$, and cooling the mother liquor to salt out additional KCl, leaving a brine carrying principally potassium carbonate.

4. In a process for producing salts of potassium and sodium by leaching potassium silicate base exchange minerals with a brine carrying principally the carbonates and chlorides of sodium, the steps for separating the sodium carbonate, potassium carbonate and potassium chloride respectively, which consist in evaporating the leach liquor so as to crystallize out sodium carbonate mono hydrate, and then cooling the mother liquor to crystallize out substantially pure potassium chloride, evaporating the remaining mother liquor in a secondary evaporator to salt out additional $Na_2CO_3H_2O$, cooling the mother liquor to salt out additional KCl, and circulating a portion of the last named mother liquor back through the secondary evaporator, leaving a brine carrying principally potassium carbonate.

5. A process for producing potassium carbonate and potassium chloride from wyomingite and Green River soda brine which consists in grinding the wyomingite and leaching under steam pressure with a solution of sodium carbonate in Green River soda brine, removing the leach solution from the solids, evaporating so as to crystallize out sodium carbonate mono hydrate until the mother liquor is substantially saturated with respect to both sodium carbonate and potassium chloride, removing said sodium carbonate mono hydrate, cooling the mother liquor so as to crystallize substantially pure potassium chloride, and removing the latter so as to leave a brine carrying principally potassium carbonate.

6. A process for producing potassium carbonate and potassium chloride from wyomingite and Green River soda brine which consists in grinding the wyomingite and leaching under steam pressure with a solution of sodium carbonate in Green River soda brine, removing the leach solution from the solids, evaporating so as to crystallize out sodium carbonate mono hydrate until the mother liquor is substantially saturated with respect to both sodium carbonate and potassium chloride, removing said sodium carbonate mono hydrate, cooling the mother liquor so as to crystallize substantially pure potassium chloride, removing the latter so as to leave a brine carrying principally potassium carbonate, and returning a portion of said brine in circulation to the evaporator feed.

7. In a process for producing potash salts by leaching potassium silicate base exchange minerals with a brine carrying principally the carbonates and chlorides of sodium, the steps for separating the sodium carbonate, potassium carbonate and potassium chloride respectively, which consist in evaporating the leach liquor so as to crystallize out sodium carbonate mono hydrate until the mother liquor is substantially saturated with respect to both sodium carbonate and potassium chloride, and then cooling the mother liquor to crystallize out substantially pure potassium chloride, leaving a brine carrying principally potassium carbonate.

8. A process for treating the system $Na_2.K_2.CO_3.Cl_2.H_2O$ for separation of $Na_2CO_3H_2O$, KCl and $K_2CO_3$ which consists in evaporating to salt out $Na_2CO_3H_2O$ until the mother liquor is substantially saturated with respect to both $Na_2CO_3$ and KCl, cooling the mother liquor to produce KCl crystals and removing, thus leaving a brine carrying principally $K_2CO_3$.

9. A process for treating the system $Na_2K_2CO_3Cl_2H_2O$ for separation of $Na_2CO_3H_2O$, KCl and $K_2CO_3$ which consists in evaporating to salt out $Na_2CO_3H_2O$, cooling the mother liquor to salt out KCl crystals, and circulating a portion of the last named mother liquor back through the evaporators, thus leaving a brine carrying principally $K_2CO_3$.

10. In a process for producing salts of potassium and sodium by leaching potassium silicate base exchange minerals with a brine carrying principally the carbonates and chlorides of sodium, the steps for separating the sodium carbonate, potassium carbonate and potassium chloride respectively, which consist in evaporating the leach liquor so as to crystallize out sodium carbonate mono hydrate, and then cooling the mother liquor to crystallize out substantially pure potassium chloride, and circulating a portion of the last named mother liquor back through the evaporator, leaving a brine carrying principally potassium carbonate.

11. The process of producing a liquid consisting essentially of an aqueous solution of potassium carbonate, which comprises leaching wyomingite with a hot solution of sodium carbonate in Green River soda brine, removing the solids present, evaporating to crystallize out sodium carbonate monohydrate until the mother liquor is substantially saturated with respect to both sodium carbonate and potassium chloride, removing said sodium carbonate monohydrate, cooling the mother liquor to crystallize out substantially pure potassium chloride, and removing said potassium chloride, whereby the remaining liquid is essentially a solution of potassium carbonate.

12. The process of producing a liquid consisting essentially of an aqueous solution of potassium carbonate, which comprises leaching potassium silicate base exchange material with a hot solution of sodium carbonate in Green River soda brine, removing the solids present, evaporating to crystallize out sodium carbonate monohydrate until the mother liquor is substantially saturated with respect to both sodium carbonate and potassium chloride, removing said sodium carbonate monohydrate, cooling the mother liquor to crystallize out substantially pure potassium chloride, and removing said potassium chloride, whereby the remaining liquid is essentially a solution of potassium carbonate.

13. The process of producing a liquid consisting essentially of an aqueous solution of potassium carbonate, which comprises leaching wyomingite with a hot solution of sodium carbonate in Green River soda brine, removing the solids present, evaporating to crystallize out sodium carbonate monohydrate until the mother liquor is substantially saturated with respect to both sodium carbonate and potassium chloride, removing said sodium carbonate monohydrate, cooling the mother liquor to crystallize out substantially pure potassium chloride, removing said potassium chloride, whereby the remaining liquid is essentially a solution of potassium carbonate, and mixing a portion of said last-mentioned solution with a fresh batch to be evaporated.

14. The process of producing a liquid consisting essentially of an aqueous solution of potassium carbonate, which comprises leaching potassium silicate base exchange material with a hot solution of sodium carbonate in Green River soda brine, removing the solids present, evaporating to crystallize out sodium carbonate monohydrate until the mother liquor is substantially saturated with respect to both sodium carbonate and potassium chloride, removing said sodium carbonate monohydrate, cooling the mother liquor to crystallize out substantially pure potassium chloride, removing said potassium chloride, whereby the remaining liquid is essentially a solution of potassium carbonate, and mixing a portion of said last-mentioned solution with a fresh batch to be evaporated.

15. The process of producing a liquid consisting essentially of an aqueous solution of potassium carbonate, which comprises leaching wyomingite with a hot solution of sodium carbonate in Green River soda brine, removing the solids present, evaporating to crystallize out sodium carbonate monohydrate until the mother liquor is substantially saturated with respect to both sodium carbonate and potassium chloride, removing said sodium carbonate monohydrate, cooling the mother liquor to crystallize out substantially pure potassium chloride, removing said potassium chloride, whereby the remaining liquid is essentially a solution of potassium carbonate, dissolving said sodium carbonate monohydrate in Green River brine to form fresh leaching solution, and leaching fresh wyomingite therewith.

16. The process of producing a liquid consisting essentially of an aqueous solution of potassium carbonate, which comprises leaching potassium silicate base exchange material with a hot solution of sodium carbonate in Green River soda brine, removing the solids present, evaporating to crystallize out sodium carbonate monohydrate until the mother liquor is substantially saturated with respect to both sodium carbonate and potassium chloride, removing said sodium carbonate monohydrate, cooling the mother liquor to crystallize out substantially pure potassium chloride, removing said potassium chloride, whereby the remaining liquid is essentially a solution of potassium carbonate, dissolving said sodium carbonate monohydrate in Green River brine to form fresh leaching solution, and leaching fresh potassium silicate base exchange material therewith.

17. The process of producing a liquid consisting essentially of an aqueous solution of potassium carbonate, which comprises leaching wyomingite with a hot solution of sodium carbonate in Green River soda brine, removing the solids present, evaporating to crystallize out sodium carbonate monohydrate until the mother liquor is substantially saturated with respect to both sodium carbonate and potassium chloride, removing said sodium carbonate monohydrate, cooling the mother liquor to crystallize out substantially pure potassium chloride, removing said potassium chloride, whereby the remaining liquid is essentially a solution of potassium carbonate, mixing a portion of said last-mentioned solution with a fresh batch to be evaporated, dissolving said sodium carbonate monohydrate in Green River brine to form fresh leaching solution, and leaching fresh wyomingite therewith.

18. The process of producing a liquid consisting essentially of an aqueous solution of potassium carbonate, which comprises leaching potassium silicate base exchange material with a hot solution of sodium carbonate in Green River soda brine, removing the solids present, evaporating to crystallize out sodium carbonate monohydrate until the mother liquor is substantially saturated with respect to both sodium carbonate and potassium chloride, removing said sodium carbonate monohydrate, cooling the mother liquor to crystallize out substantially pure potassium chloride, removing said potassium chloride whereby the remaining liquid is essentially a solution of potassium carbonate, mixing a portion of said last-mentioned solution with a fresh batch to be evaporated, dissolving said sodium carbonate monohydrate in Green River brine to form fresh leaching solution, and leaching fresh potassium silicate base exchange material therewith.

ROBERT D. PIKE.
ROSS CUMMINGS.
LEO V. STECK.